United States Patent
Lee et al.

(10) Patent No.: US 12,040,516 B2
(45) Date of Patent: Jul. 16, 2024

(54) GAS DIFFUSION LAYER INCLUDING MICROPOROUS LAYER HAVING THROUGH PASSAGES AND/OR CONCENTRATION GRADIENT OF WATER-REPELLENT RESIN IN THICKNESS DIRECTION, AND FUEL CELL INCLUDING THE SAME

(71) Applicant: JNTG Co., LTD., Hwaseong-si (KR)

(72) Inventors: Eun Sook Lee, Suwon-si (KR); Jy Young Jyoung, Suwon-si (KR); Na Hee Kang, Osan-si (KR); Do Hun Kim, Osan-si (KR); Jong Sik Ryu, Gyeonggi-do (KR)

(73) Assignee: JNTG CO., LTD., Gyeonggi-do (KR)

( * ) Notice: Subject to any disclaimer, the term of this patent is extended or adjusted under 35 U.S.C. 154(b) by 212 days.

(21) Appl. No.: 17/559,722

(22) Filed: Dec. 22, 2021

(65) Prior Publication Data

US 2022/0209270 A1 Jun. 30, 2022

(30) Foreign Application Priority Data

Dec. 30, 2020 (KR) .......................... 10-2020-0188527

(51) Int. Cl.
*H01M 8/1004* (2016.01)
(52) U.S. Cl.
CPC ................................. *H01M 8/1004* (2013.01)
(58) Field of Classification Search
CPC .................................................. H01M 8/1004
USPC .................. 502/101, 180; 429/481, 474, 534
See application file for complete search history.

(56) References Cited

U.S. PATENT DOCUMENTS

| 7,923,172 | B2 | 4/2011 | De Castro et al. |
| 2003/0059658 | A1 | 3/2003 | Kohler et al. |
| 2008/0113241 | A1* | 5/2008 | Berning ............ H01M 8/04149 429/479 |
| 2008/0299430 | A1 | 12/2008 | Ichikawa et al. |

(Continued)

FOREIGN PATENT DOCUMENTS

| CN | 110380061 A | 10/2019 |
| DE | 102018213148 A1 | 2/2020 |

(Continued)

OTHER PUBLICATIONS

Korean Office Action for Application No. 10-2020-0188527 dated Dec. 2, 2022 (translation not submitted).

(Continued)

*Primary Examiner* — Patricia L. Hailey
(74) *Attorney, Agent, or Firm* — FARBER LLC; Jonathan A. Winter

(57) ABSTRACT

Provided is a gas diffusion layer, in which a microporous layer has an inner wall of through passages and a region adjacent to the through passages containing a greater amount of a water-repellent binder resin than a region not adjacent to the through passages, and thus water formed by an electrochemical reaction is effectively discharged from the gas diffusion layer. When the gas diffusion layer of the present invention is used, an optimal water management may be possible for smooth operation under all humidity conditions including a high humidity condition and a low humidity condition, and thus a fuel cell having improved cell performance may be obtained.

19 Claims, 9 Drawing Sheets

(56) References Cited

U.S. PATENT DOCUMENTS

| | | |
|---|---|---|
| 2016/0254550 A1 | 9/2016 | Shibata |
| 2022/0021007 A1* | 1/2022 | Lee .................... H01M 4/8647 |

FOREIGN PATENT DOCUMENTS

| | | | | |
|---|---|---|---|---|
| EP | 2889939 A1 | | 7/2015 | |
| JP | 2001338651 A | * | 12/2001 | ............. H01M 4/86 |
| JP | 2003303595 A | * | 10/2003 | ............. H01M 4/86 |
| JP | 2010205450 A | | 9/2010 | |
| JP | 2013020940 A | * | 1/2013 | ......... H01M 4/8605 |
| KR | 20080045457 A | * | 5/2008 | ......... H01M 4/8821 |
| KR | 20080054285 A | * | 6/2008 | ............. H01M 4/86 |
| KR | 20140003894 A | * | 1/2014 | ............. H01M 4/88 |
| KR | 20210087825 A | * | 7/2021 | ............. H01M 4/86 |
| WO | 2020100649 A1 | | 5/2020 | |

OTHER PUBLICATIONS

European Search Report for Application No. EP 21216140.0 dated Jun. 30, 2022.

* cited by examiner

GAS DIFFUSION LAYER INCLUDING MICROPOROUS LAYER HAVING THROUGH PASSAGES AND/OR CONCENTRATION GRADIENT OF WATER-REPELLENT RESIN IN THICKNESS DIRECTION, AND FUEL CELL INCLUDING THE SAME

CROSS-REFERENCE TO RELATED APPLICATIONS

This application is based on and claims priority under 35 U.S.C. § 119 to Korean Patent Application No. 10-2020-0188527, filed on Dec. 30, 2020, in the Korean Intellectual Property Office, the disclosure of which is incorporated by reference herein in its entirety.

FIELD OF THE INVENTION

One or more embodiments relate to a gas diffusion layer (GDL) including a microporous layer (MPL) and an electrode for a fuel cell, a membrane electrode assembly (MEA) for a fuel cell, and a fuel cell, each including the GDL. More particularly, one or more embodiments relate to a GDL including an MPL having through passages formed in at least a thickness direction and/or a concentration gradient of a water-repellent resin and an electrode for a fuel cell, a membrane electrode assembly (MEA) for a fuel cell, and a fuel cell, each including the GDL.

The present disclosure relates to a result of a project (Project Number: 20011688) supported by the market independent $3^{rd}$ generation xEV industry promotion projects (Managing Agency: Korea Evaluation Institute of Industrial Technology) of the Ministry of Trade, Industry, and Energy.

BACKGROUND OF THE INVENTION

Fuel cells are electrochemical devices which generate an electrical energy through electrochemical reaction of fuel and oxygen. Since fuel cells are not heat engines, they have a high efficiency equal to or higher than the Carnot limit efficiency and discharge only water vapor as a by-product.

Compared to other fuel cells, a polymer electrolyte membrane fuel cell (PEMFC) has low operating temperature, high efficiency, high current density, high power density, short starting time, and a rapid response speed in response to a load change. In the PEMFC, a gas diffusion layer (GDL) is attached onto each of two surfaces of a catalyst coated membrane (CCM) obtained by coating two surfaces of a polymer electrolyte layer with a catalyst layer, and thus the PEMFC includes a membrane electrode assembly (MEA) having an anode (fuel electrode) and a cathode (air electrode). Bipolar plates are attached to opposite surfaces of the MEA. The GDL may be obtained by coating a carbon substrate formed of a porous carbon material such as a carbon cloth, carbon felt, and carbon paper with a microporous layer (MPL).

The MPL consists of nano-sized carbon particles such as carbon black, activated carbon, carbon nanotube (CNT), or carbon nanofiber (CNF) and a fluorinated resin such as polytetrafluoroethylene (PTFE), fluorinated ethylene propylene (FEP), or perfluoroalkoxy (PFA) that binds the nano-sized carbon particles. The fluorinated resin not only serves as a binder that binds carbon particles but also discharges water produced in a catalyst layer to a separator due to the water-repellent property of the fluorinated resin. That is, hydrogen and air are evenly spread between small pores in the MPL and move toward the catalyst layer by diffusion, which causes a uniform electrochemical reaction in the catalyst layer. Here, an interfacial structure between the catalyst layer and the MPL directly affects the electrochemical performance. The catalyst layer includes catalyst particles that are nano-sized noble metal catalyst particles such as platinum, ruthenium or alloys thereof supported on a carbon support; and an ionomer, which is a hydrogen ion conductive polymer that binds the catalyst particles. The catalyst layer, where an oxidation/reduction reaction takes place, has hydrophilic characteristics due to the ionomer having hydrogen ion conductivity while simultaneously having hydrophobic characteristics due to a porous structure of the support. In order to facilitate gas flow in the catalyst layer and to quickly discharge the generated water toward the MPL, an interfacial structure between the catalyst layer and the MPL is very important.

Particularly, as MEA manufacturing technology develops and the separator has got a structure that facilitates gas discharge, the electrochemical performance of the MEA stack has been improved. Accordingly, an energy density of the MEA stack has been increased, and an operating current density of the MEA stack has been increased up to two times at the same operating voltage. However, as the current density increases, required amounts of hydrogen and air also need to be increased, and accordingly an amount of the generated water increases proportionally.

In an MPL of the related art, a slurry obtained by dispersing carbon particles and a fluorinated resin in a dispersion medium consisting of a solvent and a dispersant is coated on a carbon substrate to a constant thickness, the dispersant is removed through a drying process and a sintering process, and the fluorinated resin is melted to implement a water-repellent property. Since the MPL of the related art is formed using a mixture of the carbon particles and the fluorinated resin of the same ratio, the MPL has the same water-repellent property in a thickness direction of the MPL. The water generated by an electrochemical reaction is concentrated at an interface between the catalyst layer and the MPL, and the water is discharged to the outside by sequentially moving from the interface to the carbon substrate and the separator in a thickness direction of the MPL. However, when the water concentrated at the interface of the catalyst layer and the MPL is not quickly discharged toward the GDL and the separator as the current density increases, the water at the interface of the catalyst layer and the MPL may flood and form a water layer, and flooding may sequentially occur in an MPL moistened section and a carbon substrate section. This interferes supply of a reaction gas to the catalyst layer and thus becomes a cause of rapidly deteriorating electrochemical performance of the MEA stack. Also, the water layer formed at the interface of the catalyst layer and the MPL may cause a reverse potential and cause a corrosion reaction of carbon rather than an electrochemical reaction that produces electricity. Accordingly, the catalyst support and the MPL may be corroded, which leads to an increase in resistance and a decrease in durability.

SUMMARY OF THE INVENTION

One or more embodiments include a gas diffusion layer (GDL) for a fuel cell, the GDL including a microporous layer (MPL), i) in which through passages through which water and gas may flow are formed in a thickness direction of the MPL from a surface of the MPL to a carbon substrate, and an inner wall of the through passages and a region adjacent to the through passages in the MPL include a greater amount of a water-repellent binder resin than that in a region of the MPL not adjacent to the through passages, and/or ii) having a concentration gradient of the water-repellent binder resin in a thickness direction of the MPL from a surface of the MPL to a carbon substrate, which allows an interface between a catalyst layer and the MPL to have high water-repellency, and thus water formed at an air electrode may be effectively discharged to a porous separator by an osmotic pressure, wherein, particularly, the MPL has no water flooding and has smooth gas flow at a high current density.

One or more embodiments include a membrane electrode assembly (MEA) including the GDL.

One or more embodiments include a fuel cell having improved cell performance by including the GDL for a fuel cell or the MEA.

Additional aspects will be set forth in part in the description which follows and, in part, will be apparent from the description, or may be learned by practice of the presented embodiments of the disclosure.

According to one or more embodiments, a gas diffusion layer for a fuel cell includes a carbon substrate and a microporous layer formed on the carbon substrate.

According to an aspect of one or more embodiments, provided is a gas diffusion layer (GDL), in which a microporous layer (MPL) includes carbon particles and a water-repellent binder resin binding the carbon particles, wherein the MPL has a first surface bonded to a carbon substrate and a second surface facing opposite to the first surface, wherein the MPL includes through passages, which are formed of micropores and extended in a thickness direction of the MPL from the first surface to the second surface or from the second surface to the first surface, wherein water and gas may flow through the through passages, wherein, in the MPL, an inner wall of the through passages and a region adjacent to the through passages include a greater amount of the water-repellent binder resin than that in a region not adjacent to the through passages, thereby promoting discharging water formed near the second surface in a direction to the first surface.

According to one or more embodiments, the MPL includes a concentration gradient of the water-repellent binder resin in a thickness direction, wherein when a concentration of the water-repellent binder resin on the second surface is C1, a concentration of the water-repellent binder resin at a portion of the MPL penetrated into the carbon substrate is C2, and a concentration of the water-repellent binder resin in the carbon substrate not penetrated by the portion of the MPL is C3, the concentration gradient satisfies a condition of C1>C2>C3.

According to one or more embodiments, the region of the MPL adjacent to the through passages may be a region spaced apart from the through passages by about 3 μm to about 300 μm in a horizontal direction of the second surface of the MPL.

According to one or more embodiments, the through passages may be in a capillary shape having a width from about 3 μm to about 25 μm and a depth from about 30 μm to about 100 μm.

According to one or more embodiments, the region not adjacent to the through passages may include from about 15 weight % to about 35 weight % of the water-repellant binder resin and from about 65 weight % to about 85 weight % of the carbon particles; and the region adjacent to the through passages may include from about 25 weight % to about 50 weight % of the water-repellant binder resin and from about 75 weight % to about 50 weight % of the carbon particles.

According to one or more embodiments, the region adjacent to the through passages may have an area ratio in a range of about 10% to about 40% based on a surface area of the MPL.

According to one or more embodiments, the second surface may face a catalyst layer, and the first surface may face a porous separator.

According to one or more embodiments, the water-repellent binder resin may be a fluorinated resin.

According to one or more embodiments, the carbon particles may include a carbon material having electrical conductivity and may be at least one selected from the group consisting of carbon black, acetylene black, ketjen black, denka black, carbon whiskers, activated carbon fibers, vapor grown carbon fibers (VGCFs), carbon aerosols, carbon nanotubes, carbon nanofibers, carbon nanohorns, and graphite, or a combination thereof.

According to another aspect of one or more embodiments, provided is a gas diffusion layer (GDL) for a fuel cell, wherein the GDL includes a carbon substrate and a microporous layer (MPL) formed on the carbon substrate, wherein the MPL has a concentration gradient of a water-repellent fluorinated resin in a thickness direction, wherein when a concentration of the water-repellent fluorinated resin on a surface of the MPL is C1, a concentration of the water-repellent fluorinated resin at a portion of the MPL penetrated into the carbon substrate is C2, and a concentration of the water-repellent fluorinated resin in the carbon substrate is C3, the concentration gradient satisfies a condition of C1>C2>C3.

According to another aspect of one or more embodiments, provided is a membrane electrode assembly (MEA) including the GDL according to an aspect of one or more embodiments.

According to another aspect of one or more embodiments, provided is a fuel cell including the GDL according to an aspect of one or more embodiments or the MEA according to another aspect of one or more embodiments.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION OF THE INVENTION

Figure 1:
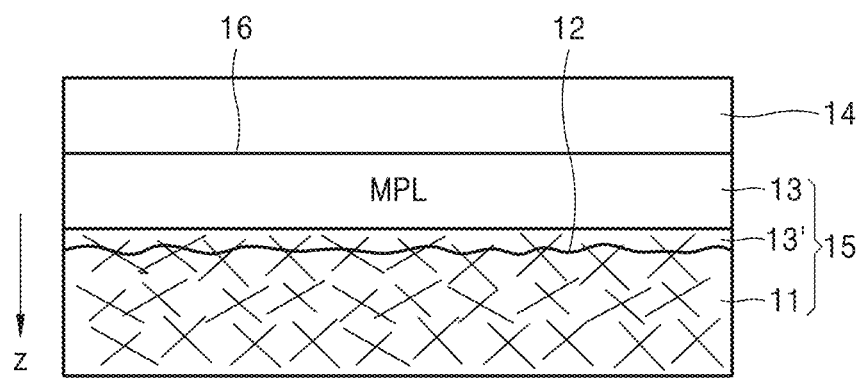
FIG. 1 is a schematic cross-sectional view that illustrates a structure of a gas diffusion layer 15 including a microporous layer 13 according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, according to one or more embodiments, a gas diffusion layer (GDL) including a microporous layer (MPL), an electrode for a fuel cell, a membrane electrode assembly (MEA), and a fuel cell will be described in detail with reference to the drawings. However, it should be understood that embodiments described herein should be considered in a descriptive sense only and not for purposes of limitation. Thus, it will be understood by one of ordinary skill in the art that various amendments or modifications may be made to the one or more exemplary embodiments of the present disclosure without departing from the spirit and scope.

FIG. 1 is a schematic cross-sectional view that illustrates a structure of a gas diffusion layer (GDL) 15 for a fuel cell, the GDL 15 including a microporous layer (MPL) 13 according to an embodiment.

Referring to FIG. 1, the MPL consists of a portion of MPL 13 stacked on a carbon substrate 11 and not penetrated into the carbon substrate 11; and a portion of MPL 13' penetrated into the carbon substrate 11. The GDL 15 includes the carbon substrate 11 and the MPL 13 and 13' stacked on the carbon substrate 11. The MPL 13 and 13' include carbon particles and a binder resin that binds the carbon particles. The MPL 13 and 13' has a first surface 12 of a portion bonded to the carbon substrate 11; and a second surface 16 facing opposite to the first surface 12. In the MEA, a catalyst layer 14 is formed on the MPL 13 and 13'.

A lower portion of the carbon substrate 11 is in contact with a gas channel (not shown). An arrow z in FIG. 1 denotes a thickness direction of the MPL 13 and 13'. The second surface 16 may face the catalyst layer 14, and the first surface 12 may face a separator.

In the GDL 15, a thickness of the MPL 13 and 13' may be in a range of about 20 μm to about 200 μm, for example, about 20 μm to about 150 μm, about 30 μm to about 100 μm, about 30 μm to about 80 μm, about 30 μm to about 70 μm, about 30 μm to about 60 μm, or about 20 μm to about 50 μm, but embodiments are not limited thereto. In the GDL 15, an average thickness of the carbon substrate 11 may be in a range of about 20 μm to about 1000 μm, for example, about 30 μm to about 600 μm, about 50 μm to about 500 μm, about 100 μm to about 450 μm, about 100 μm to about 400 μm, about 100 μm to about 300 μm, or about 100 μm to about 280 μm, but embodiments are not limited thereto.

Figure 2:
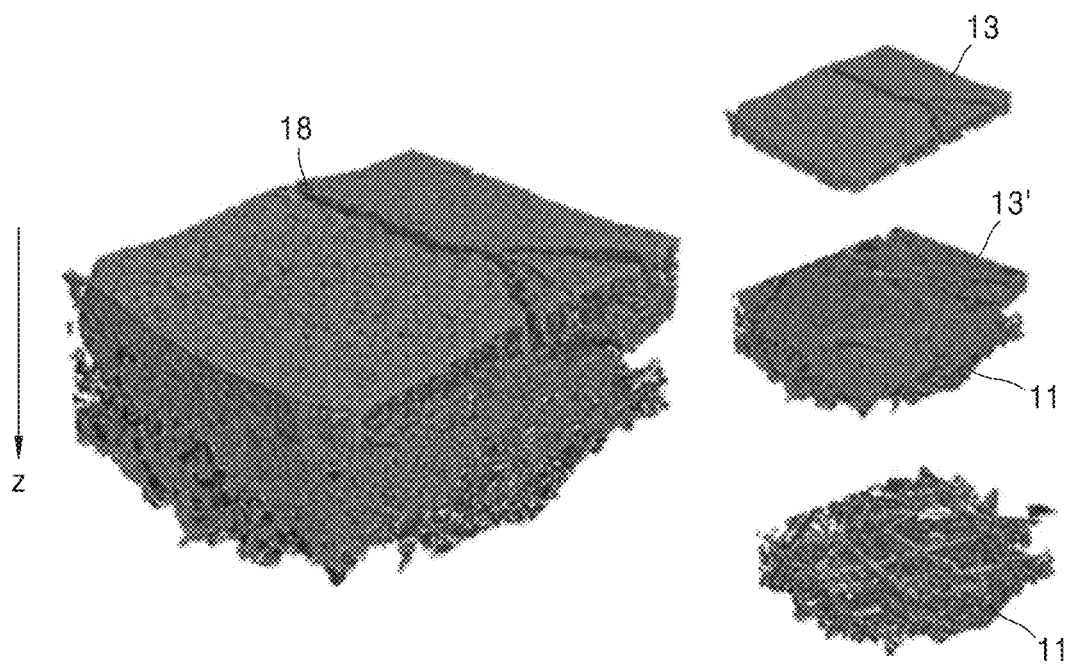
FIG. 2 is a schematic perspective view that illustrates the structure of the gas diffusion layer 15 shown in the schematic cross-sectional view of FIG. 1 in further detail.

FIG. 2 is a schematic perspective view that illustrates the structure of the GDL 15 shown in the schematic cross-sectional view of FIG. 1 in further detail.

Referring to FIG. 2, the carbon substrate 11 and the MPL 13 and 13' formed on the carbon substrate 11 are shown in the left side of FIG. 2, and a schematic view of the GDL 13 in which the carbon substrate 11 and the MPL 13 and 13' are disassembled is shown in the right side of FIG. 2. Referring to a schematic exploded perspective view in the right side of FIG. 2, the GDL 15 includes a main body layer 13 of the MPL 13 and 13' including the second surface 16 in a thickness direction z of the MPL 13 and 13' from top to bottom, an MPL portion 13' of the first surface 12 side penetrated into the carbon substrate 11, and the carbon substrate 11 under the MPL portion 13'. The MPL 13 and 13' include through passages 18 that are formed of micropores and extended from the first surface 12 to the second surface 16 or from the second surface 16 to the first surface 12. Water and air or gases such as hydrogen produced from an electrochemical reaction may flow through the through passages 18. An inner wall of the through passages 18 and a region adjacent to the through passages 18 in the MPL 13 and 13', for example, a region adjacent to the through passages 18 on the second surface 16 of the MPL 13 and 13', may include a greater amount of a water-repellent binder resin than that in a region not adjacent to the through passages 18. Thus, as an osmotic pressure may be increased by a function of a concentration gradient of the water-repellent binder resin, discharging of water formed near the second surface 16 in a direction toward the first surface 12 and the carbon substrate 11 may be facilitated.

The region adjacent to the through passages 18 may be a region that is spaced apart by about 30 μm to about 300 μm in a horizontal direction of the MPL 13 from the through passages 18, for example, in a horizontal direction from the second surface 16 of the MPL 13.

Figure 3:
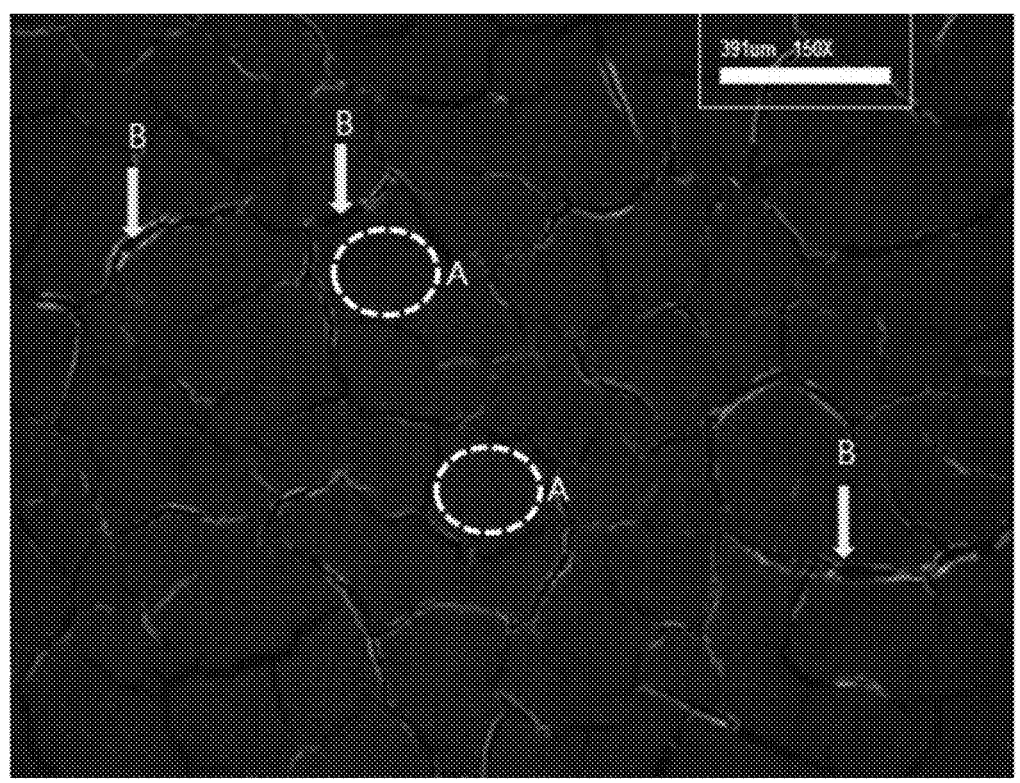
FIG. 3 is a microscope image at 150× magnification that shows a surface of a microporous layer of a gas diffusion layer prepared in Example 1 and distribution of a water-repellent binder resin in through passages.

FIG. 3 is a microscope image at 150× magnification that shows a surface of a microporous layer (MPL) of a gas diffusion layer (GDL) prepared in Example 1 and distribution of a water-repellent binder resin in through passages; In the image, a region indicated by 'A' is an MPL surface area between the through passages and not adjacent to the through passages. That is, the 'A' region denotes an area outside a point, which is spaced apart by about 5 μm from the through passages 18 in a horizontal direction on the second surface 16 of the MPL 13 and 13'. A region indicated by 'B' refers to through passages 18 and an MPL surface area adjacent to the through passages 18, that is, the total area of a surface area of a space occupied by the through passages 18 and an area up to a point, which is spaced apart by about 5 μm from the through passages 18 in a horizontal direction on the second surface 16 of the MPLs 13 and 13'. Referring to FIG. 3, it may be confirmed that the water-repellent binder resin shown in a whiter color is particularly more coated in the 'B' region, which includes the through passages 18 and an MPL surface area adjacent to the through passages 18. That is, in a GDL according to an embodiment, an MPL may include two regions having different amounts of a water-repellent binder resin. An 'A' region not adjacent to through passages may include about 15 weight % to about 35 weight % of the water-repellent binder resin and about 65 weight % to about 85 weight % of carbon particles, and a 'B' region adjacent to the through passages may include about 25 weight % to about 50 weight % of the water-repellent binder resin and about 75 weight % to about 50 weight % of carbon particles.

In the GDL according to an embodiment, the MPL may include the 'A' region and the 'B' region, where an area of the 'B' region may be controlled to be in a range of about 10% to about 40% based on a surface area of the MPL. When an area ratio of the 'B' region is less than about 10%, a water diffusion rate may decrease, and when a concentration of a reaction gas is low, electrochemical performance of a MEA stack may be reduced, and discharging of water may not be smoothly performed. When an area ratio of the 'B' region is greater than about 40%, an electrochemical reaction may irregularly occur in the catalyst layer 14 as a distribution amount of gas only increases toward a side of the catalyst layer 14 adjacent to the through passages, and thus electrochemical performance of the MEA stack may be deteriorated.

The through passages 18 may have a shape and a size of a capillary having a width from about 3 μm to about 25 μm and a depth from about 30 μm to about 100 μm. When the width of the through passages 18 is less than about 3 μm, water flooding may easily occur, and when the width of the through passages 18 is greater than about 25 μm, a degree of surface roughness of the MPL 13 decreases, and thus interfacial resistance between the catalyst layer 14 and the MPL 13 increases, which may result in deterioration of electrochemical performance of the MEA stack. The depth of the through passages 18 tends to increase in proportion to a thickness of the GDL 15. When the depth of the through passages 18 is less than about 30 μm, the through passages 18 are only formed in the MPL 13, which lowers permeability of water and gas of the MPL 13, and when the depth of the through passages 18 is greater than about 100 μm, the through passages 18 are connected to the carbon substrate 11, and thus water flooding may easily occur in the carbon substrate 11.

Examples of the carbon substrate 11 may include carbon paper, carbon fiber, carbon felt, or carbon sheet, but embodiments are not limited thereto. The carbon substrate 11 may have the thickness and pores described above.

When a GDL according to an embodiment is formed by coating a carbon substrate with a composition for an MPL, the carbon substrate may be carbon paper, which is, for example, commercially available under the product number JNT18, JNT21, JNT20, JNT30, or JNT40 available from JNTG (Hwaseong-si, Gyeonggi-do, Republic of Korea). The carbon substrate may be impregnated with a water-repellent polymer resin, and this may be used in preparation of a GDL. When the carbon substrate is impregnated with the water-repellent polymer resin, the water-repellent polymer resin may have a thickness not exceeding 10 μm, particularly, in a range of about 1 μm to about 5 μm, and more particularly about 1 μm or less.

A carbon particle or powder included in the MPL is not particularly limited. The carbon particle may be crystalline carbon or amorphous carbon, but embodiments are not limited thereto. The carbon particle may be a combination of at least two of crystalline carbon, amorphous carbon, and activated carbon in various ratios. The carbon particle may be commercially purchased or may be prepared for this use. For example, the carbon particle may be at least one selected from the group consisting of activated carbon, carbon black, acetylene black, ketjen black, denka black, carbon whiskers, activated carbon fiber, vapor-grown carbon fiber (VGCF), carbon aerosols, carbon nanotubes, carbon nanofibers, carbon nanohorns, and natural or artificial graphite, or a combination thereof, but embodiments are not limited thereto. Examples of the carbon particle may be commercially available carbon black under a product name, such as Vulcan XC-72 (Cabot Corp.) and Shawinigan Black, grade 55 (Chevron Phillips Chemical Company), Furnace Black N762 or Furnace Black N550 (Cancarb), or Lamp Black 101 (Orion Engineered Carbons).

The water-repellent binder resin is not particularly limited and may be any water-repellent binder resin that may bind with a carbon material such as a carbon particle. The water-repellent binder resin may include or may be formed of a fluorinated resin having excellent thermal stability and water-repellency. The fluorinated resin may be at least one selected from the group consisting of polytetrafluoroethylene (PTFE), a tetrafluoroethylene-perfluoroalkylvinylether copolymer, a fluorinated ethylene-propylene (FEP) copolymer, a tetrafluoroethylene-hexafluoropropylene copolymer, perfluoroalkoxy (PFA), polychlorotrifluoroethylene, an ethylene-tetrafluoroethylene (ETFE) copolymer, polyfluorovinylidene (PVDF), and a PVDF-based copolymer or a combination thereof, but embodiments are not limited thereto.

The GDL 15 including the MPL 13 according to an embodiment having the structure described above may be prepared using any appropriate method known in the art, for example, by preparing a slurry composition for a microporous layer and applying the composition on a substrate.

The composition for a microporous layer according to an embodiment may be prepared using a method known in the art, for example, using common appropriate materials known to one of ordinary skill in the art. Accordingly, the slurry composition for the microporous layer may further include a water-repellent binder resin such as carbon particles and a fluorinated resin described above. Also, the composition for the microporous layer may further include a dispersant and a solvent. For example, the slurry composition for a microporous layer according to an embodiment may be prepared by a method including adding carbon particles into a solution including a dispersant to be impregnated with a solvent on the surface of the carbon particles and milling or high-speed mixing the solution to obtain a mixture, in which components such as carbon particles are finely in nano- or micro-scale and homogenously dispersed; and adding a fluorinated resin such as PTFE as a water-repellent binder resin into the mixture and mixing the mixture to homogeneously disperse the fluorinated resin in the mixture.

The dispersant is not particularly limited and may be any material capable of homogeneously dispersing carbon materials such as carbon particles. For example, the dispersant may be at least one selected from the group consisting of a cationic surfactant, an anionic surfactant, a non-ionic surfactant, and an amphoteric surfactant, or a combination thereof. In particular, examples of the dispersant may be cationic surfactants, such as alkyltrimethylammonium salts, alkyldimethylbenzylammonium salts, and phosphate amine salts; anionic surfactants, such as polyoxyalkylene alkylethers, polyoxyethylene derivatives, alkyl amine oxide, and polyoxyalkylene glycol; amphoteric surfactants, such as alanines, imidazolium betaines, amidopropyl betaines, and amino dipropionic acid salts; and non-ionic surfactants, such as alkylarylpolyether alcohol, but embodiments are not limited thereto. Examples of commercially available anionic surfactants may be HOSTAPAL and EMULSOGEN (Clariant), DISPERSBYK (BYK), and DISPERS (TEGO). An example of a commercially available non-ionic surfactant may be Triton X-100 (Dow Chemical Company). The dispersant may be a material removable via thermal decomposition at a temperature in a range of about 250° C. to about 400° C.

In the composition for forming a microporous layer according to an embodiment, the amounts of the dispersant and the solvent may be varied depending on the type and specific surface area of the carbon particle. For example, when using carbon particles having a large specific surface area, such as ketjen black, micropores of ketjen black may adsorb a large amount of the solvent, making dispersion difficult, and thus a large amount of the dispersant may be needed to improve dispersion ability. On the other hand, when using carbon particles having a small specific surface area, such as acetylene black, relatively small amounts of the solvent and the dispersant may be used.

The composition for a microporous layer according to an embodiment may include at least one type or at least two types of solvents For example, a basic solvent such as water, n-propanol, or isopropanol may be used alone or in a combination thereof. In some embodiments, a solvent having a high boiling point such as ethylene glycol, glycerol, dimethyl sulfoxide (DMSO), N-methyl-2-pyrrolidone (NMP), or butyl acetate may be further mixed with the basic solvent.

A method of coating the composition for a microporous layer may be spray coating, doctor blade coating, comma coating, or slot die coating, and any coating method may be used. A thickness of the MPL is not particularly limited, and a thickness of the MPL and a concentration of the fluorinated resin may be changed according to the application and stack operation conditions.

After preparing the composition for a microporous layer according to an embodiment, the composition for a microporous layer may be coated, dried, and sintered on a carbon substrate to form a microporous layer according to an embodiment on a carbon substrate. Here, when the slurry composition for a microporous layer is coated and dried on the carbon substrate, some portion of the microporous layer may penetrate into the carbon substrate, and the other portion of the microporous layer may form a layer on a surface of the carbon substrate. The through passages of the microporous layer are formed from a surface of the MPL portion 13 to the MPL portion 13' penetrated into the carbon substrate 11. In order to form the through passages in the MPL, about 3 weight % to about 30 weight % of a pore former based on the total weight of a fluorinated resin and carbon particles is mixed in the slurry composition for a microporous layer. The pore former may be decomposed into a gaseous phase or release gas by the function of a temperature in a range of about 100° C. to about 400° C. in the drying and sintering steps, and thus pores, i.e., ultimately through passages, may be formed in the MPL. Examples of the pore former added in the slurry composition to form through passages are not particularly limited as long as they may achieve the function described above, and the examples may include at least one selected from natural polymers such as agar, alginates, gelatin, or starch, spherical plastic polymers that may be decomposed at a temperature in a range of about 100° C. to about 400° C., and compounds that generate gases such as sodium hydrogen carbonate and ammonium carbonate.

Finally, a method of including a greater amount of a water-repellent binder resin in an inner wall of the through passages in the MPL and a region adjacent to the through passages than that in a region not adjacent to the through passages will be described.

First, a fluorinated resin solution is prepared by dissolving or dispersing a fluorinated resin in a solvent. Then, the fluorinated resin solution is allowed to be permeated from a lower portion of the carbon substrate 11, on which the MPL having the through passages prepared as described above is stacked, to the second surface 16 of the MPL. In this regard, the fluorinated resin solution is supplied to the carbon substrate at a constant pressure with the microporous layer facing upward and the carbon substrate facing downward. The fluorinated resin solution is impregnated into the portion of the MPL penetrated into the carbon substrate and up to the MPL thereon not penetrated into the carbon substrate in a thickness direction z through the carbon substrate. Thus, a greater amount of the fluorinated-resin solution may be coated on the through passages of the MPL and a region adjacent to the through passages, and a less amount of the fluorinated-resin solution may be coated on a region distances apart therefrom, that is, a region not adjacent to the through passages. In this way, when the GDL coated with the fluorinated resin is dried and sintered, the through passages and the region adjacent thereto may have a greater amount of the fluorinated resin coated thereon and thus appear whiter as shown in FIG. 3.

A GDL 15 according to another embodiment includes an MPL having a structure which suppresses water flooding at a high current density by allowing the MPL to have a water-repellency gradient in a thickness direction of the MPL to facilitate gas flow. In particular, the GDL 15 according to another embodiment further includes MPL 13 and 13' having a concentration gradient of a water-repellent binder resin in a thickness direction z in place of or in addition to the relation with first uneven distribution where a greater amount of the water-repellent binder resin is distributed in the region adjacent to through passes 18 in the MPLs 13 and 13'. Particularly, in the GDL 15 according to another embodiment, when a concentration of the water-repellent binder resin on a second surface 16 of the MPL 13 and 13' is C1, a concentration of the water-repellent binder resin at a portion 13' of the MPL penetrated into a carbon substrate is C2, and a concentration of the water-repellent binder resin at the carbon substrate 11 not penetrated by the portion 13' of the MPL is C3, the concentration gradient may satisfy a condition of C1>C2>C3.

Figure 4:
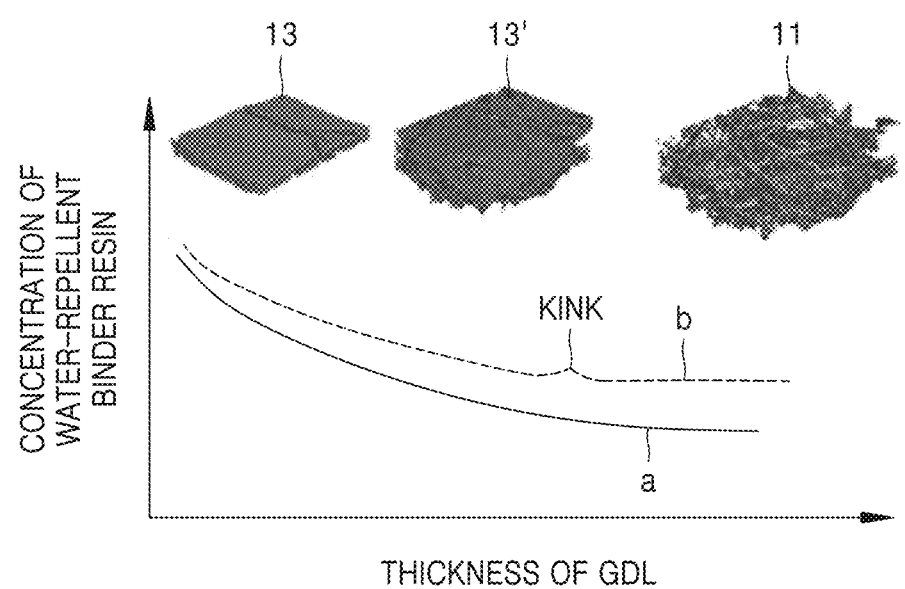
FIG. 4 is a schematic graph that describes a concentration gradient of a water-repellent binder resin in a gas diffusion layer 15 according to another embodiment in a thickness direction z.

FIG. 4 is a schematic graph that describes a concentration gradient of a water-repellent binder resin in a gas diffusion layer 15 according to another embodiment in a thickness direction z.

In FIG. 4, a concentration distribution curve of the water-repellent binder resin in the GDL 15 along the thickness direction z is shown. When a concentration of the water-repellent binder resin on a second surface 16 of the MPL 13 and 13' is C1, a concentration of the water-repellent binder resin at a portion 13' of the MPL penetrated into a carbon substrate 11 is C2, and a concentration of the water-repellent binder resin at the carbon substrate 11 not penetrated by the portion 13' of the MPL is C3, the concentration gradient may satisfy a condition of C1>C2>C3. In the GDL 15, a concentration of the water-repellent binder resin in a thickness direction z is highest on the second surface 16 of the MPL 13 and 13', is reduced at a portion 13' of the MPL penetrated into the carbon substrate 11, and is further lower in the carbon substrate 11 not penetrated by the portion 13' of the MPL. The weight ratios of the water-repellent binder resin in a thickness direction z are such that the concentration C2 may be in a range of about 60 to 90 and the concentration C3 may be in a range of about 10 to about 25 based on the concentration C1 being 100 by weight which is the concentration of the water-repellent binder resin on the second surface 16 of the MPL 13 and 13'. An example of the water-repellent binder resin is a fluorinated resin in the following description. In this case, a concentration of the fluorinated resin may be measured by energy dispersive X-ray analysis (EDAX). When the EDAX method is used, an atomic ratio of fluorine atoms calculated by measuring characteristic peak areas of carbon (C) atoms and fluorine (F) atoms, F/(C+F), on the second surface 16 of the MPL 13 and 13' may be controlled to be in a range of about 40 atom % to about 55 atom %, an atomic ratio of fluorine atoms calculated in the MPL 13 right under the second surface 16 may be controlled to be in a range of about 25 atom % to about 40 atom %, an atomic ratio of fluorine atoms calculated in the portion 13' of the MPL penetrated into the carbon substrate 11 may be controlled to be in a range of about 25 atom % to about 35 atom %, and an atomic ratio of fluorine atoms calculated in the carbon substrate 11 not penetrated by the portion 13' of the MPL may be controlled to be in a range of about 5 atom % to about 20 atom %.

In the GDL 15, for example, a concentration of the water-repellent binder resin in the MPL 13 and 13' is the sum of amounts of the water-repellent binder resin in the MPL 13 and 13' area and the through passages 18. The case indicated by 'a' in FIG. 4 represents a case having a concentration gradient (i.e., concentration variation) expressed as a smooth curve not having a kink, and the case indicated by 'b' represents a case having a concentration gradient expressed as a discontinuous curve with a vertex (in other words, unsmooth curve having a kink). The gradient curve according to an embodiment is not limited thereto and there may be a case, for example, in which the gradient is expressed as a unsmooth curve having two or more kinks. A method to implement this will be described hereinafter.

The MPL 13 and 13' may include not only the through passages but also a concentration distribution of a water-repellent binder resin in a thickness direction z of the MPL 13 and 13' or GDL 15. In some embodiments, the MPL 13 and 13' according to another embodiment may include one of the through passages and the concentration distribution of the water-repellent binder resin in a thickness direction z of the MPL 13 and 13' or GDL 15.

Hereinafter, a method of preparing a GDL 15 including an MPL 13 according to another embodiment having a structure shown in FIG. 4 will be described. However, descriptions overlapping in the preparation method of the GDL 15 including the MPL 13 and 13' according to an embodiment will be omitted to avoid redundancy.

First, a method of preparing a GDL 15 including the MPL 13 and 13' according to an embodiment in which a fluorinated resin concentration varies along a gradient represented by a continuous curve without a vertex (in other words, a smooth curve without a kink) ('a' in FIG. 4) in a thickness direction of the GDL 15 will be described. For example, a composition for an MPL prepared as described above, e.g., a slurry composition for a first MPL having a weight ratio of carbon particles/a fluorinated resin in a range of about 75/25 weight % to about 65/35 weight % is first coated and dried on a surface of a carbon substrate having been coated with a fluorinated resin so that the carbon substrate has a concentration of the fluorinated resin in a range of about 5 weight % to about 15 weight %. Here, thus-obtained first MPL may be partially penetrated into the carbon substrate, and a thickness of the first MPL on the carbon substrate not penetrated into the carbon substrate may be in a range of about 10 μm to about 30 μm. Subsequently, a slurry composition for a second MPL having a weight ratio of carbon particles/a fluorinated resin in a range of about 50/50 weight % to about 60/40 weight % is coated and dried on the first MPL to form a second MPL. The first and second MPLs thus prepared are sintered in an oven of about 350° C. to prepare a GDL. The total thickness of the MPL combining the first and second MPLs after the sintering process is controlled to be in a range of about 30 μm to about 60 μm. A concentration of the fluorinated resin at an interface of the first and second MPLs may be between a concentration value of the first MPL and a concentration value of the second MPL.

Then, a method of preparing a GDL 15 including the MPL 13 and 13' according to another embodiment in which a fluorinated resin concentration varies along a gradient represented by a discontinuous curve with a vertex (in other words, unsmooth curve with a kink) ('b' in FIG. 4) in a thickness direction of the GDL 15 will be described. For a fluorinated resin concentration to have two different gradients, basically the same method described above is used. In particular, the composition for MPL described above, e.g., an MPL slurry composition having a weight ratio of carbon particles/fluorinated resin in a range of about 75/25 weight % to about 65/35 weight % is coated and dried on one surface of a carbon substrate having been coated with a fluorinated resin such that the carbon substrate has a concentration of the fluorinated resin in a range of about 5 weight % to about 15 weight %. Thus-prepared MPL may be partially penetrated into the carbon substrate, and a thickness of the MPL on a surface of the carbon substrate not penetrated into the carbon substrate may be controlled to be in a range of about 30 μm to about 40 μm. Subsequently, a fluorinated resin solution is additionally coated on the dried surface of the MPL to form a very thin fluorinated resin layer on the MPL. When the resultant is dried and sintered, a gas diffusion layer with a fluorinated resin concentration distribution generally having two different gradients as shown in 'b' of FIG. 4 may be obtained. After forming an MPL in this manner, the process of forming a fluorinated resin layer may be repeated to obtain a gas diffusion layer with a fluorinated resin concentration distribution generally having three gradients. A fluorinated resin concentration on a surface of the MPL in thus obtained gas diffusion layer is high, and thus the gas diffusion layer may have high water-repellency and improved water discharging characteristics. In particular, water flooding at a portion adjacent to a catalyst layer at a high current density may be effectively suppressed, and durability of the MPL in regard of oxidation of the catalyst layer may be increased.

A fuel cell provided herein is not particularly limited as long as it includes a gas diffusion layer according to an embodiment. For example, the fuel cell provided herein may include an anode, a cathode, an electrolyte membrane, and a gas diffusion layer, wherein the gas diffusion layer may be the gas diffusion layer according to an embodiment. The fuel cell provided herein may be, for example, a polymer electrolyte type, a phosphoric acid type, or an alkaline aqueous solution type depending on a type of an electrolyte, but the type of the fuel cell is not particularly limited. The gas diffusion layer according to an embodiment is useful in manufacture of a hydrogen fuel cell for automobiles.

The fuel cell provided herein may be prepared using an appropriate method known to one of ordinary skill in the art, except that the fuel cell includes the gas diffusion layer according to an embodiment.

Since the gas diffusion layer according to an embodiment of the present invention enables water management optimized in various humidity conditions, the gas diffusion layer and fuel cell employing the same may be appropriately used as a fuel cell for vehicles or buildings. Also, the gas diffusion layer according to an embodiment of the present invention may be applied not only to a fuel cell but also to electrolyzers such as polymer electrolyte membrane electrolyzers or alkaline electrolyzer or to energy storage devices using carbon materials such as electric double layer capacitors. Therefore, performance of an electrolyzer or an energy storage device including the gas diffusion layer according to an embodiment may be improved.

Hereinafter, the present invention will be described in more detail with reference to the following examples, but the examples are for illustrative purposes only and are not intended to limit the present invention to the following examples.

Example 1 (EX 1)

i) Preparation of Composition for Microporous Layer 1,000 g of deionized water and 1 g of a non-ionic dispersant (Triton X-100) were mixed in a mixing tank to prepare a solution. 100 g of carbon black having a specific surface area of about 250 $m^2$/g and an average primary particle size of about 30 nm was mixed with the solution. 71.4 g of a polytetrafluoroethylene (PTFE) emulsion (including PTFE in an amount of 60 weight %), as a fluorinated resin, and 10 g of sodium hydrogen carbonate, as a polymer-type pore former were further added to the mixture, and the mixture thus obtained was mechanically stirred to perform high-speed dispersion.

Thus obtained dispersion was placed in a basket mill containing alumina balls having a size of about 2 mm and ball-milled for about 1 hour to finely disperse particles in the dispersion. Deionized water was added and mixed to the dispersion so that an amount of PTFE in the resulting dispersion was 30 weight % to prepare a slurry composition for a microporous layer (including carbon black and PTFE in a solids content at a weight ratio of 70/30).

ii) Preparation of Gas Diffusion Layer and Formation of Through Passages

The PTFE emulsion (including PTFE in an amount of 60 weight %) was diluted with deionized water so that an amount of PTFE was adjusted to 5 weight %. A sheet of carbon paper (available from JNTG, product name: JNT20) having a thickness of about 210 μm was impregnated with the PTFE emulsion, and thus the carbon paper was coated such that an amount of PTFE immersed in the carbon paper was about 10 weight %. The carbon paper was dried at room temperature, and thus a water-repellent carbon substrate coated with a fluorinated resin was obtained.

Subsequently, the slurry composition for a microporous layer obtained above was discharged at a constant pressure using a slot die coater to apply the slurry composition on one surface of the water-repellent carbon substrate. Thereafter, the water-repellent carbon substrate was dried in a drying furnace having a temperature distribution in a range of about 100° C. to about 130° C. for about 20 minutes. The resultant was sintered in an air atmosphere at a temperature of about 350° C. for about 20 minutes, and thus a gas diffusion layer (GDL), which included a microporous layer (MPL) stacked on the water-repellent carbon substrate, was obtained. Here, as the pore former self-decomposed during drying and sintering of the carbon substrate, empty spaces were formed, which pushed the carbon black and PTFE slurry, and thus through passages extending in a thickness direction were formed in the microporous layer.

iii) Additional Impregnation of Fluorinated Resin Via Through Passages

Next, an MPL surface side was placed upward, and a carbon substrate side was placed downward. The PTFE emulsion (including PTFE in an amount of 60 weight %) was diluted with deionized water so that an amount of PTFE was adjusted to 5 weight %, and the adjusted PTFE emulsion was supplied to a slot die at a constant pressure using a metering pump on the carbon substrate side of the GDL. The PTFE emulsion was impregnated from the carbon substrate side to the layer in which the MPL was impregnated into the carbon substrate and a surface of the MPL in a thickness direction by capillary phenomenon via through passages.

Then, the impregnated GDL was dried again in a drying furnace having a temperature distribution in a range of about 100° C. to about 130° C. for about 20 minutes and sintered in an air atmosphere at a temperature of about 350° C. for about 20 minutes to melt and adhere PTFE to the GDL. The total thickness of the GDL thus obtained was about 250 μm, and a thickness of the MPL in the GDL was about 40 μm.

FIG. 3 is a microscope image at 150× magnification that shows distribution of a water-repellent fluorinated resin on a surface of the MPL and through passages of the GDL prepared in Example 1. In the image, an area indicated by 'A' represents a surface area of the MPL not adjacent to the through passages between the through passages, and an area indicated by 'B' represents the trough passages and a surface area of the MPL adjacent to the through passages. Referring to FIG. 3, it may be confirmed that the through passages and the area adjacent to the through passages of the MPL are particularly coated with a greater amount of the fluorinated resin, which appears whiter.

Example 2 (EX 2)

A GDL was prepared in the same manner as in Example 1, except that in step i) an amount of the polymer-type pore former added in the preparation of the composition for an MPL was increased to 20 g, and in steps ii) and iii) the water-repellant carbon substrate was rapidly dried in a drying furnace having a temperature distribution in a range of about 160° C. to about 180° C. for about 20 minutes and sintered.

Comparative Example (CEX)

A GDL was prepared in the same manner as in Example 1, except that in step i) the polymer-type pore former was not added in the preparation of the composition for an MPL, and then only the step ii) was performed. As a result, a GDL having a conventional MPL, in which through passages are not formed, was obtained.

Widths and a surface area ratio of through passages and a gas permeability and an electrical resistance with respect to the GDLs prepared in Examples 1 and 2 and Comparative Example were measured, and the results are summarized in Table 1.

TABLE 1

| Criteria | Example 1 | Example 2 | Comparative Example |
|---|---|---|---|
| Widths of through passages (μm) | about 10 to 20 | about 3 to 5 & about 10 to 20 | — |
| Surface area ratio of MPL surface (%) occupied by through passages (B) | about 15 | about 25 | — |
| Air permeability in thickness direction of GDL (cm³/cm² · s) | 3.0 | 4.5 | 1.0 |
| Electrical resistance of GDL (mΩ · cm²) | 5.2 | 6.5 | 5.0 |

Figure 5:
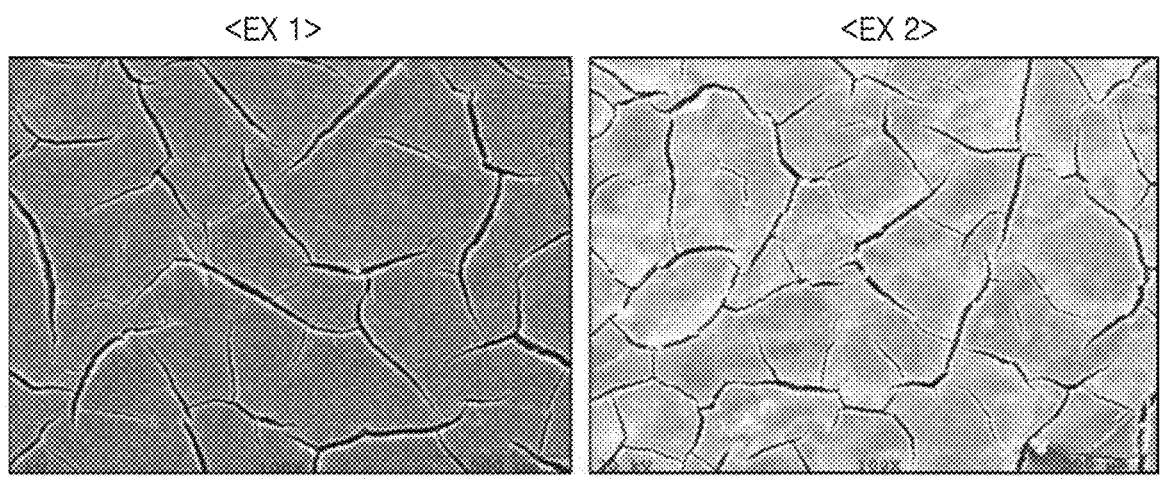
FIG. 5 shows a scanning electron microscope (SEM) images of surfaces of microporous layers prepared in Examples 1 and 2.

FIG. 5 shows scanning electron microscopic (SEM) images of MPL surfaces of the MPLs prepared in Examples 1 and 2.

Referring to Table 1 and FIG. 5, comparing Examples 1 and 2 in which the pore former was used in preparation of a composition for an MPL, through passages formed along the thickness direction were observed in both of the MPLs prepared in Examples 1 and 2. In the case of Example 1, few through passages had a narrow width, and as large passages having a width in a range of about 10 to 20 μm were formed, a surface area ratio occupied by the through passages was about 15%. On the contrary, in the case of Example 2, not only large passages having a width of about 10 to 20 μm were formed, but also narrow passages having a width of about 3 to 5 μm were evenly formed between the large passages, so that the surface area ratio occupied by the through passages was increased to about 25%. As a result, it may be confirmed that the surface area ratio occupied by the through passages (B) was increased on a surface of the MPL prepared in Example 2, of which the drying temperature of the water-repellent carbon substrate in the step ii) of the preparation of the GDL was higher than the drying temperature in Example 1. That is, it showed that as the drying temperature and the pore former ratio were low, a width of the through passages and a surface area ratio occupied by the through passages were relatively low, and an MPL region not adjacent to the through passages was increased.

Referring to Table 1, an air permeability of Examples 1 and 2 having through passages were increased about 3-fold and 4.5-fold, each respectively, as compared with that of Comparative Example not having through passages, whereas the electric resistance of Examples 1 and 2 was similar to that of Comparative Example. In particular, as the surface area ratio occupied by the through passages (B) on the MPL surface increases, the air permeability tended to increase.

Manufacture Example 1: Manufacture of Unit Cell of Fuel Cell

A unit cell of a polymer electrolyte-type fuel cell was manufactured using the GDL prepared in Example 1 as a cathode GDL and an anode GDL and a commercial membrane electrode assembly (MEA). The commercial MEA was purchased from Gore Ltd. under the product name of PRIMEA 5710.

Manufacture Example 2: Manufacture of Unit Cell of Fuel Cell

A unit cell of a fuel cell was manufactured and operated in the same manner as in Manufacture Example 1, except that the GDL of Example 2 was used instead of the GDL of Example 1.

Comparative Manufacture Example 1: Manufacture of Unit Cell of Fuel Cell

A unit cell of a fuel cell was manufactured and operated in the same manner as in Manufacture Example 1, except that the GDL of Comparative Example was used instead of the GDL of Example 1.

Physical properties shown in Tables 1 and 2 were measured as follows.

Evaluation Example 1: Measurement of Width of Through Passages

Surfaces of the MPLs of the prepared GDLs were taken at 150× magnification using a microscope, and the obtained images were used to measure the widths of the through passages using a length measurement program.

Evaluation Example 2: Measurement of Surface Area Ratio Occupied by Through Passages (B) on MPL Surface Surfaces of the MPLs of the GDLs were taken at 150× magnification using a microscope, and the obtained images were used to measure the surface area ratio using a length and area measurement program.

Evaluation Example 3: Measurement of Air Permeability in Thickness Direction of GDL Air permeabilities of the GDLs were measured using an air permeability tester (model: FX3300-IV, available from Textest Instruments, France). Here, the air permeability was based on an amount of air permeating the GDL when a pressure difference applied on 38 cm² of an area of the GDL at room temperature (about 20° C.) was 125 kPa.

Evaluation Example 4: Measurement of Electric Resistance in Thru-Plane Direction of GDL Voltage drops (unit: V) of the GDLs were each measured by placing 4 sheets of the GDL to be measured between gold-coated Cu plates and flowing a current of 1 A in a thickness direction while applying a pressure of 100 N/cm² thereon. Again, a voltage drop of 2 sheets of the GDL was measured, and a resistance value was calculated from the difference of the two resistances.

Evaluation Example 5: Measurement of Amounts of Fluorinated Resin of MPL and Surface of MPL Amounts or concentrations of a fluorinated resin of the MPL and a surface of the MPL were measured by scanning electron microscope-energy dispersive X-ray analysis (SEM-EDAX). In particular, images of second surfaces of the GDLs were obtained at 100× magnification using SEM-EDAX (model: VegaII, available from Tescan), and element ratios of carbon (C) atoms and fluorine (F) atoms were measured by EDAX. A fluorinated resin concentration in a direction of the Z-axis was performed using the images taken by sequentially peeling off the MPL with a tape and by EDAX analysis. An element ratio of carbon atoms and fluorine atoms in the region of interest, such as the uppermost layer of the MPL of each of the GDLs was measured, and the fluorinated resin concentration in the region of interest was calculated using the element ratio.

Evaluation Example 6: Evaluation of Electrochemical Performance of Unit Cell

In the unit cell of a fuel cell prepared in each of Manufacture Examples 1 and 2 and Comparative Manufacture Example, hydrogen was supplied to the anode, and air was supplied to the cathode, wherein the unit fuel cell was operated while supplying hydrogen to the anode at a flow rate of 1.5 times the stoichiometric ratio and air to the cathode at a flow rate of 2.0 times the stoichiometric ratio under high humidity conditions of 65° C., 100% of a relative humidity (RH), and atmospheric pressure; and under low humidity conditions of 75° C., 30% of a relative humidity (RH), and atmospheric pressure to measure a voltage change of the fuel cell according to a current density.

Evaluation Example 7: Measurement of Contact Angle

Changes in a contact angle value according to an impregnation time of the GDLs were measured using a contact angle measurement system (model: DSA 10, available from KRUSS GmbH). Here, 9 μl of distilled water was used in the measurement at room temperature (about 20° C.) in the sessile mode.

Figure 6:
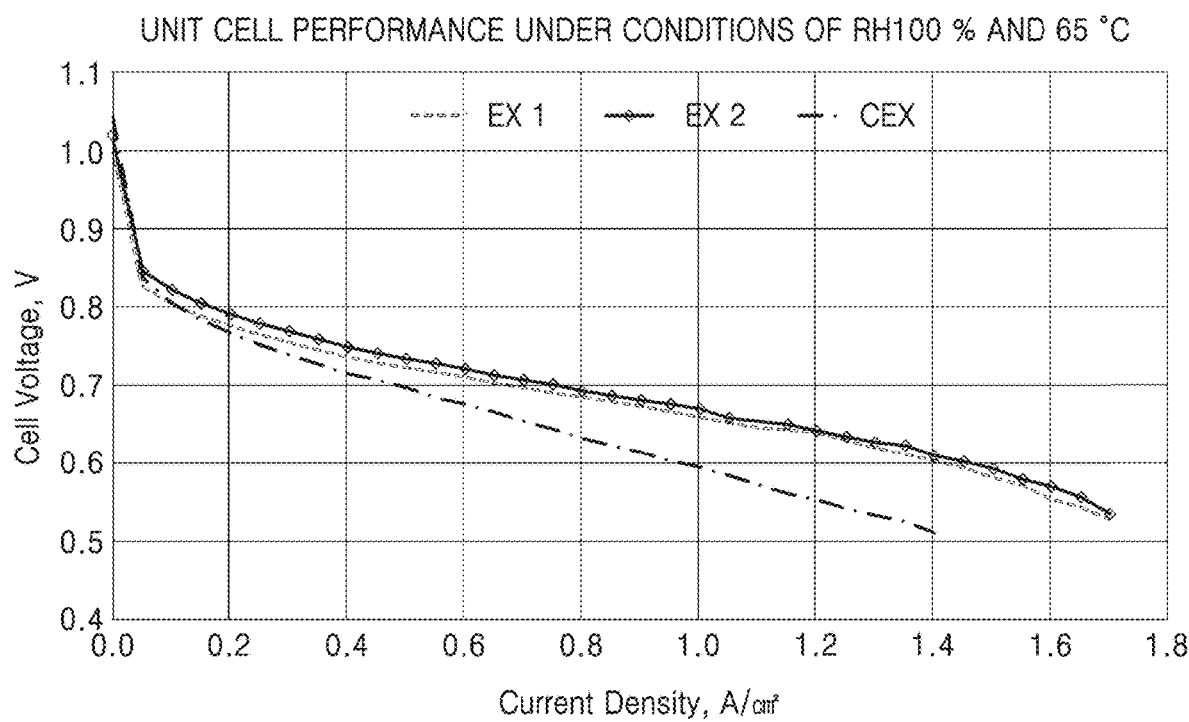
FIGS. 6 and 7 are graphs that show voltage changes of unit cells according to a current density under different humidity conditions using the unit cells of fuel cells prepared in Examples 1 and 2 and Comparative Example.
Figure 7:
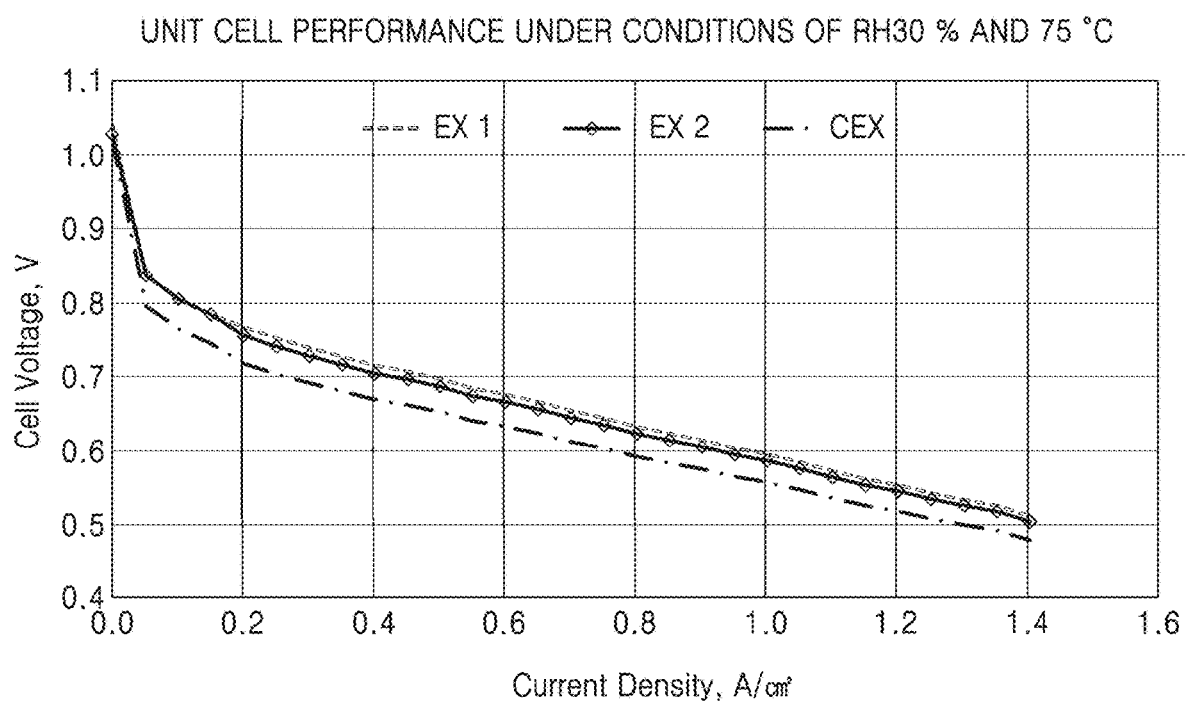

FIGS. 6 and 7 are graphs that show voltage changes of the unit cells according to a current density under different humidity conditions using the unit cells of fuel cells prepared in Examples 1 and 2 and Comparative Example. FIG. 6 shows voltage changes of the unit cells under i) the high humidity conditions of atmospheric pressure, a temperature of 65° C., and a relative humidity (RH) of 100%, and FIG. 7 shows voltage changes of the unit cells under ii) the low humidity conditions of atmospheric pressure, a temperature of 75° C., and a relative humidity (RH) of 30%.

Referring to FIGS. 6 and 7, i) as a current density increased under the high humidity conditions of 100% of RH, the unit cells of Examples 1 and 2 having excellent water discharging properties exhibited significantly excellent electrochemical performance as compared with the unit cell of Comparative Example. Particularly, in the section of high current density of 0.6 A/cm2 or more where a water discharge amount increases, a mass transfer resistance of the unit cell of Comparative Example was increased, and thus the electrochemical performance was rapidly reduced, whereas the unit cells of Examples 1 and 2 particularly had a structure that allows gas to flow and water to be discharged via the through passages at a high current density, and thus it may be known that the unit cells of Examples 1 and 2 had excellent electrochemical performance. Here, since a concentration of the fluorinated polymer resin of the region adjacent to the through passages is higher than that of other regions of the MPL, the through passages may well serve as passages that facilitates water discharge and even gas diffusion. In terms of the unit cell performance evaluation under ii) the low humidity conditions of 30% of RH, the GDL of Example 1 in which narrow through passages were less formed than the GDL of Example 2 exhibited more excellent electrochemical performance as compared with that of the GDL of Example 2 in which a relatively large number of narrow through passages were formed. That is, water discharge is important under low humidity conditions, but it is also very important to back-diffuse some of water produced in an air electrode toward a catalyst layer and an electrolyte membrane from the MPL so that the electrolyte membrane may have a constant ion conductivity. It is interpreted that the through passages functioned to maintain the electrochemical performance of the unit cell high even under low humidity conditions due to the back-diffusion of water since areas of the through passages of the MPL of Example 1 were small. In contrast, the unit cell using the GDL of Comparative Example did not have through passages and thus exhibited low electrochemical performance regardless of humidity conditions.

Example 3 (EX 3)

i) Preparation of Composition for First and Second Microporous Layers 1,000 g of deionized water and 1 g of a non-ionic dispersant (Triton X-100) were mixed in a mixing tank to prepare a solution. 100 g of carbon black having a specific surface area of about 250 m$^2$/g and an average primary particle size of about 30 nm was mixed with the solution. 71.4 g of a polytetrafluoroethylene (PTFE) emulsion (including PTFE in an amount of 60 weight %), as a fluorinated resin, and 10 g of sodium hydrogen carbonate, as a polymer-type pore former were further added to the mixture, and the mixture thus obtained was mechanically stirred to perform high-speed dispersion.

Thus obtained dispersion was placed in a basket mill containing alumina balls having a size of about 2 mm and ball-milled for about 1 hour to finely disperse particles in the dispersion. Deionized water was added and mixed to the dispersion so that an amount of PTFE in the resulting dispersion was 30 weight % to prepare a slurry composition for a first MLP (including carbon black and PTFE in a solids content at a weight ratio of 70/30). At the same time, deionized water was added and mixed to the dispersion so that an amount of PTFE in the resulting dispersion was 40 weight % to prepare a slurry composition for a second MPL (including carbon black and PTFE in a solids content at a weight ratio of 60/40).

ii) Preparation of Gas Diffusion Layer and Formation of Through Passages

The PTFE emulsion (including PTFE in an amount of 60 weight %) was diluted with deionized water so that an amount of PTFE was adjusted to 5 weight %. A sheet of carbon paper (available from JNTG, product name: JNT20) having a thickness of about 210 μm was impregnated with the PTFE emulsion, and thus the carbon paper was coated such that an amount of PTFE immersed in the carbon paper was about 10 weight %. The carbon paper was dried at room temperature, and thus a water-repellent carbon substrate coated with a fluorinated resin was obtained.

Subsequently, the slurry composition for a first MPL obtained above was discharged at a constant pressure using a slot die coater to apply the first slurry composition on one surface of the water-repellent carbon substrate. Thereafter, the water-repellent carbon substrate was dried in a drying furnace having a temperature distribution in a range of about 100° C. to about 130° C. for about 20 minutes to form a first MPL. Here, the first MPL partially penetrated into the water-repellent carbon substrate, and a thickness of the first MPL formed on a surface of the substrate was about 26 μm.

Subsequently, the slurry composition for a second MPL obtained above was discharged at a constant pressure using a slot die coater to apply the second slurry composition on the first MPL. Thereafter, the water-repellent carbon substrate was dried in a drying furnace having a temperature distribution in a range of about 100° C. to about 130° C. for about 20 minutes to form a second MPL on the first MPL. The resultant was sintered in an air atmosphere at a temperature of about 350° C. for about 20 minutes, and thus a GDL, which included an MPL having a final thickness of about 55 μm and stacked on the water-repellent carbon substrate, was obtained. The final MPL was a layer formed by combining the first MPL and the second MPL on the first MPL. Here, as the pore former self-decomposed during drying and sintering of the carbon substrate, the carbon black and PTFE slurry were pushed, and thus through passages extending in a thickness direction were formed in the final MPL.

iii) Additional Impregnation of Fluorinated Resin Via Through Passages

Next, an MPL surface side was placed upward, and a carbon substrate side was placed downward. The PTFE emulsion (including PTFE in an amount of 60 weight %) was diluted with deionized water so that an amount of PTFE was adjusted to 5 weight %, and the adjusted PTFE emulsion was supplied to a slot die at a constant pressure using a metering pump on the carbon substrate side of the GDL. The PTFE emulsion was impregnated from the carbon substrate side to the layer in which the MPL was impregnated in or penetrated the carbon substrate and a surface of the final MPL in a thickness direction by capillary phenomenon via through passages.

Then, the impregnated GDL was dried again in a drying furnace having a temperature distribution in a range of about 100° C. to about 130° C. for about 10 minutes and sintered in an air atmosphere at a temperature of about 350° C. for about 20 minutes to melt and adhere PTFE to the GDL. The GDL thus obtained had through passages; and a fluorinated resin concentration gradient which varies along a smooth curve in the thickness direction of the GDL, and the total thickness of the GDL was about 254 μm.

Example 4 (EX 4)

i) Preparation of Composition for MPL

A slurry composition (having carbon black: PTFE weight ratio of 70/30 in a solid content) for an MPL having PTFE in an amount of 30 weight % as described in Example 1 or 3 was prepared.

ii) Preparation of GDL

The PTFE emulsion (including PTFE in an amount of 60 weight %) was diluted with deionized water so that an amount of PTFE was adjusted to 5 weight %. A sheet of carbon paper (available from JNTG, product name: JNT20) having a thickness of about 270 μm was impregnated with the PTFE emulsion, and thus the carbon paper was coated such that an amount of PTFE immersed in the carbon paper was about 10 weight %. The carbon paper was dried at room temperature, and thus a water-repellent carbon substrate coated with a fluorinated resin was obtained.

Subsequently, the slurry composition for an MPL obtained above was discharged at a constant pressure using a slot die coater to apply the slurry composition on one surface of the water-repellent carbon substrate. Thereafter, the water-repellent carbon substrate was dried in a drying furnace having a temperature distribution in a range of about 100° C. to about 130° C. for about 20 minutes to form an MPL. Here, the MPL was partially penetrated into the water-repellent carbon substrate, and a thickness of the MPL formed on a surface of the substrate was about 37 μm.

Subsequently, the PTFE emulsion adjusted so that an amount of PTFE was 5 weight % was discharged at a constant pressure using a slot die coater to additionally apply the PTFE emulsion on a surface of the MPL. Thereafter, the water-repellent carbon substrate was dried in a drying furnace having a temperature distribution in a range of about 100° C. to about 130° C. for about 20 minutes to form a PTFE thin-film layer on the surface of the MPL. The resultant was sintered in an air atmosphere at a temperature of about 350° C. for about 20 minutes, and thus a GDL, which included an MPL having a final thickness of about 34 μm and stacked on the water-repellent carbon substrate, was obtained. Here, as the pore former self-decomposed during drying and sintering of the carbon substrate, the carbon black and PTFE slurry were pushed, and thus through passages extending in a thickness direction were formed in the MPL.

iii) Additional Impregnation of Fluorinated Resin Via Through Passages

Next, a final MPL surface side was placed upward, and a carbon substrate side was placed downward. The PTFE emulsion (including PTFE in an amount of 60 weight %) was diluted with deionized water so that an amount of PTFE was adjusted to 5 weight %, and the adjusted PTFE emulsion was supplied on the carbon substrate side of the GDL at a constant pressure. The PTFE emulsion was impregnated from the carbon substrate side to the layer in which the MPL was impregnated in or penetrated the carbon substrate and to a surface of the MPL in a thickness direction by capillary phenomenon via through passages.

Then, the impregnated GDL was dried again in a drying furnace having a temperature distribution in a range of about 100° C. to about 130° C. for about 20 minutes and sintered in an air atmosphere at a temperature of about 350° C. for about 20 minutes to melt and adhere PTFE to the GDL. The GDL thus obtained had through passages; and a fluorinated resin concentration gradient which varies along a unsmooth curve with a kink in the thickness direction of the GDL, and the total thickness of the GDL was about 253 μm.

Manufacture Examples 3 and 4: Preparation of Unit Cell of Fuel Cell

Unit cells of a fuel cell were prepared in the same manner as in Manufacture Example 1, except that the GDLs of Examples 3 and 4 where each used instead of the GDL of Example 1.

An amount of the fluorinated resin, widths of through passages, a surface area ratio of the through passages, and electrical resistance in the MPL measured with respect to each of the GDLs prepared in Examples 3 and 4 and Comparative Example are summarized in Table 2.

TABLE 2

| Criteria | Example 3 | Example 4 | Comparative Example |
|---|---|---|---|
| Amount of fluorinated resin on MPL surface (weight %) | about 40 | about 50 | about 30 |
| Amount of fluorinated resin of second MPL (weight %) | about 30 | about 30 | — |
| Amount of fluorinated resin (weight %) in carbon substrate | about 10 | about 10 | about 10 |

TABLE 2-continued

| Criteria | Example 3 | Example 4 | Comparative Example |
|---|---|---|---|
| Widths of through passages (μm) | 10 to 20 | 10 to 20 | — |
| Area ratio (%) occupied by through passages (B) on MPL surface | about 15 | about 15 | — |
| GDL electrical resistance (mΩ · cm$^2$) | 5.8 | 6.5 | 5.0 |

Referring to Table 2, it was confirmed that the electrical resistance of the GDLs of Examples 3 and 4 was somewhat increased as compared with that of Comparative Example, but the electrochemical performance of the unit cell at RH of 100% of the GDLs of Examples 3 and 4 was significantly improved as compared with that of Comparative Example.

Next, durability of the GDLs obtained from Examples 3 and 4 and Comparative Example was evaluated in an atmosphere similar to that of an operation environment of an actual hydrogen fuel cell. First, an electrical resistance in a through-plane direction of the GDL and a contact angel between the MPL and the carbon substrate were measured. Then, each of the GDLs was immersed in a beaker equipped in a water bath at 80° C., a mixed solution of 15 weight % of hydrogen peroxide and 1 M of sulfuric acid (at a weight ratio of 1:1) was added to the beaker, and the beaker was covered with a lid. After every predetermined time period in the immersed state, the GDL was removed from the beaker and dried, and an electrical resistance and a contact angle of the GDL were measured. In this regard, the durability of the GDL was evaluated by the change in the physical properties of the GDL over time under conditions similar to that of an operation environment of a hydrogen fuel cell.

Figure 8:
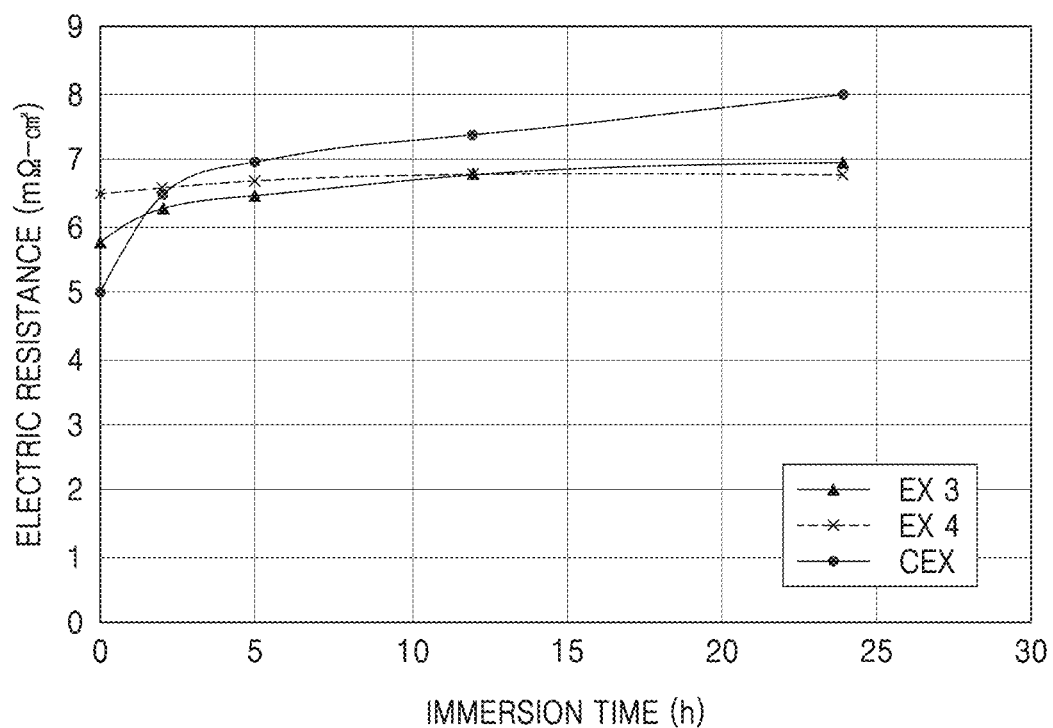
FIG. 8 a graph that shows changes in electrical resistance of gas diffusion layers prepared in Examples 3 and 4 and Comparative Example according to an immersion time in a mixed solution of 15 weight % of hydrogen peroxide and 1 M of sulfuric acid.

FIG. 8 is a graph that shows a change in electrical resistance of the GDLs obtained in Examples 3 and 4 and Comparative Example according to an immersion time in the mixed solution of 15 weight % of hydrogen peroxide and 1 M of sulfuric acid. Referring to FIG. 8, an initial electrical resistance value of the GDL of Comparative Example was low before the immersion, but the electrical resistance had increased as the immersion time elapsed. This is because the MPL was partially peeled off due to the influence of an environment of the strong acid and oxidizing agent and due to partial corrosion of the carbon component. In contrast, initial resistance values of the GDLs of Examples 3 and 4 were slightly higher, but the electrical resistance values of the GDLs of Examples 3 and 4 hardly changed even when the immersion time was lengthened. This is interpreted that because the higher the fluorinated resin gradient in the MPL, the greater the bonding strength between the MPLs and the bonding strength between the MPL and the carbon substrate by the water-repellent fluorinated resin.

Figure 9:
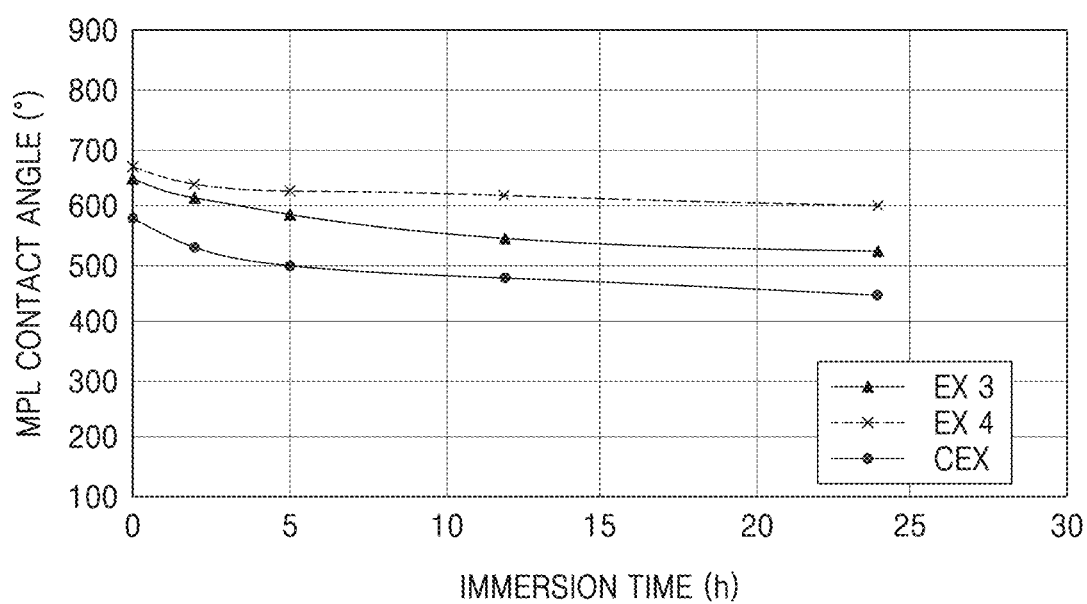
FIG. 9 is a graph that shows changes in a contact angle of the gas diffusion layers prepared in Examples 3 and 4 and Comparative Example according to an immersion time in the mixed solution of 15 weight % of hydrogen peroxide and 1 M of sulfuric acid.

FIG. 9 is a graph that shows the change in the contact angle of the GDLs prepared in Examples 3 and 4 and Comparative Example according to an immersion time in the mixed solution of 15 weight % of hydrogen peroxide and 1 M of sulfuric acid. Referring to FIG. 9, it was confirmed that the change in the contact angle of the MPL surface was also very small in the GDLs of Examples 3 and 4, particularly in the GDL of Example 4, as compared with that of the GDL of Comparative Example. In this regard, the GDL according to the present invention may be evaluated as exhibiting very stable electrochemical performance in the actual fuel cell operation environment due to its good durability.

According to one or more embodiments, a gas diffusion layer (GDL) has through passages formed in at least a thickness direction thereof and/or a concentration gradient of a water-repellent resin. In particular, the GDL according to an embodiment has i) through passages through which water and gas may flow from a surface of a microporous layer (MPL) to a carbon substrate in a thickness direction of the MPL, wherein an inner walls of the through passages and regions adjacent to the through passages in the MPL include a greater amount of the water-repellent binder resin than that of regions of the MPL not adjacent to the through passages, and/or ii) a concentration gradient of the water-repellent resin from the surface of the MPL to the carbon substrate in a thickness direction. Accordingly, since an interface between a catalyst layer and the MPL in a fuel cell including an electrode including a gas diffusion layer according to an embodiment has a gradient of high water-repellency, water formed at an air electrode by an osmotic pressure may be effectively discharged to a porous separator.

Thus, the GDL according to an embodiment has improved water discharging ability throughout the whole layer, which efficiently discharges water generated during operation of a fuel cell, and thus degradation of battery performance caused by water flooding may effectively be prevented. Particularly, in the fuel cell including the GDL according to an embodiment, water flooding may effectively be suppressed, and gas flow may be facilitated even when the fuel cell is operated under all humidity conditions including a high humidity condition and a low humidity condition, particularly at a high current density. Therefore, the fuel cell including the GDL according to an embodiment may have excellent durability and may exhibit stable battery performance over a long period of time. Accordingly, when the GDL according to an embodiment is used, optimized water management for smooth operation of a fuel cell under all humidity conditions including a high humidity condition and a low humidity condition may be possible, and thus a fuel cell having improved cell performance may be obtained.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A gas diffusion layer for a fuel cell, the gas diffusion layer comprising
   a carbon substrate; and
   a microporous layer (MPL) provided on the carbon substrate,
   wherein the MPL comprises carbon particles and a water-repellent binder resin binding the carbon particles, has a first surface bonded to the carbon substrate and a second surface facing opposite to the first surface, and comprises through passages, which are formed of micropores and extended in a thickness direction of the MPL from the first surface to the second surface or from the second surface to the first surface, wherein water and gas may flow through the through passages, wherein, in the MPL, an inner wall of the through passages and a region adjacent to the through passages comprise a greater amount of the water-repellent binder resin than that in a region not adjacent to the through passages, thereby promoting discharging water formed near the second surface in a direction to the first surface.

2. The gas diffusion layer of claim 1, wherein the MPL further comprises a concentration gradient of the water-repellent binder resin in the thickness direction of the MPL,
wherein when a concentration of the water-repellent binder resin on the second surface is C1, a concentration of the water-repellent binder resin at a portion of the MPL penetrated into the carbon substrate is C2, and a concentration of the water-repellent binder resin in the carbon substrate not penetrated by the portion of the MPL is C3, the concentration gradient satisfies a condition of C1>C2>C3.

3. The gas diffusion layer of claim 1, wherein the region adjacent to the through passages is a region spaced apart from the through passages by 3 μm to 300 μm in a horizontal direction of the MPL.

4. The gas diffusion layer of claim 1, wherein the through passages are in a capillary shape having a width from 3 μm to 25 μm and a depth from 30 μm to 100 μm.

5. The gas diffusion layer of claim 1, wherein the region not adjacent to the through passages comprises from 15 weight % to 35 weight % of the water-repellant binder resin and from 65 weight % to 85 weight % of the carbon particles; and
the region adjacent to the through passages comprises from 25 weight % to 50 weight % of the water-repellant binder resin and from 75 weight % to 50 weight % of the carbon particles.

6. The gas diffusion layer of claim 1, wherein the region adjacent to the through passages have an area ratio in a range of 10% to 40% based on a surface area of the MPL.

7. The gas diffusion layer of claim 1, wherein the second surface faces an air electrode, and the first surface faces a porous separator.

8. The gas diffusion layer of claim 1, wherein the water-repellent binder resin is a fluorinated resin.

9. The gas diffusion layer of claim 1, wherein the carbon particles are at least one selected from the group consisting of carbon black, activated carbon, acetylene black, ketjen black, denka black, carbon whiskers, activated carbon fibers, vapor grown carbon fibers (VGCFs), carbon aerosols, carbon nanotubes, carbon nanofibers, carbon nanohorns, and graphite.

10. A gas diffusion layer for a fuel cell, the gas diffusion layer comprising a carbon substrate and a microporous layer (MPL) provided on the carbon substrate,
wherein the MPL has a concentration gradient of a water-repellent fluorinated resin in the thickness direction of the MPL,
wherein when a concentration of the water-repellent fluorinated resin on a surface of the MPL is C1, a concentration of the water-repellent fluorinated resin of a portion of the MPL penetrated into the carbon substrate is C2, and a concentration of the water-repellent fluorinated resin in the carbon substrate is C3, the concentration gradient satisfies a condition of C1>C2>C3.

11. A membrane electrode assembly (MEA) for a fuel cell, the MEA comprising a gas diffusion layer for a fuel cell, the gas diffusion layer comprising
a carbon substrate; and
a microporous layer (MPL) provided on the carbon substrate,
wherein the MPL comprises carbon particles and a water-repellent binder resin binding the carbon particles, has a first surface bonded to the carbon substrate and a second surface facing opposite to the first surface, and comprises through passages, which are formed of micropores and extended in a thickness direction of the MPL from the first surface to the second surface or from the second surface to the first surface, wherein water and gas may flow through the through passages, wherein, in the MPL, an inner wall of the through passages and a region adjacent to the through passages comprise a greater amount of the water-repellent binder resin than that in a region not adjacent to the through passages, thereby promoting discharging water formed near the second surface in a direction to the first surface.

12. The membrane electrode assembly of claim 11, wherein the MPL further comprises a concentration gradient of the water-repellent binder resin in the thickness direction of the MPL,
wherein when a concentration of the water-repellent binder resin on the second surface is C1, a concentration of the water-repellent binder resin at a portion of the MPL penetrated into the carbon substrate is C2, and a concentration of the water-repellent binder resin in the carbon substrate not penetrated by the portion of the MPL is C3, the concentration gradient satisfies a condition of C1>C2>C3.

13. The membrane electrode assembly of claim 11, wherein the region adjacent to the through passages is a region spaced apart from the through passages by 3 μm to 300 μm in a horizontal direction of the MPL.

14. The membrane electrode assembly of claim 11, wherein the through passages are in a capillary shape having a width from 3 μm to 25 μm and a depth from 30 μm to 100 μm.

15. The membrane electrode assembly of claim 11, wherein the region not adjacent to the through passages comprises from 15 weight % to 35 weight % of the water-repellant binder resin and from 65 weight % to 85 weight % of the carbon particles; and
the region adjacent to the through passages comprises from 25 weight % to 50 weight % of the water-repellant binder resin and from 75 weight % to 50 weight % of the carbon particles.

16. The membrane electrode assembly of claim 11, wherein the region adjacent to the through passages have an area ratio in a range of 10% to 40% based on a surface area of the MPL.

17. The membrane electrode assembly of claim 11, wherein the second surface faces an air electrode, and the first surface faces a porous separator.

18. The membrane electrode assembly of claim 11, wherein the water-repellent binder resin is a fluorinated resin.

19. The membrane electrode assembly of claim 11, wherein the carbon particles are at least one selected from the group consisting of carbon black, activated carbon, acetylene black, ketjen black, denka black, carbon whiskers, activated carbon fibers, vapor grown carbon fibers (VGCFs), carbon aerosols, carbon nanotubes, carbon nanofibers, carbon nanohorns, and graphite.

* * * * *